US009122767B2

(12) United States Patent
Carter et al.

(10) Patent No.: US 9,122,767 B2
(45) Date of Patent: Sep. 1, 2015

(54) METHOD AND APPARATUS FOR PRE-RENDERING EXPECTED SYSTEM RESPONSE

(75) Inventors: Wayne Carter, Salt Lake City, UT (US); Sridhar Tadepalli, Foster City, CA (US); Rahim Yaseen, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 276 days.

(21) Appl. No.: 13/235,990

(22) Filed: Sep. 19, 2011

(65) Prior Publication Data
US 2012/0072498 A1 Mar. 22, 2012

Related U.S. Application Data

(60) Provisional application No. 61/384,150, filed on Sep. 17, 2010.

(51) Int. Cl.
*G06F 15/16* (2006.01)
*G06F 12/00* (2006.01)
*G06F 17/30* (2006.01)
*H04M 1/725* (2006.01)

(52) U.S. Cl.
CPC .... *G06F 17/30905* (2013.01); *G06F 17/30893* (2013.01); *H04M 1/72583* (2013.01); *G06F 17/30569* (2013.01)

(58) Field of Classification Search
CPC .............................. G06F 17/30569
USPC .......... 709/203, 217–219, 226; 715/747, 767; 711/137
See application file for complete search history.

(56) References Cited

U.S. PATENT DOCUMENTS

| 5,572,643 | A | 11/1996 | Judson | 395/793 |
| 6,128,621 | A | 10/2000 | Weisz | 707/103 |
| 6,268,856 | B1 | 7/2001 | Bruck et al. | 345/357 |
| 6,327,628 | B1 | 12/2001 | Anuff et al. | 719/311 |
| 6,501,956 | B1 | 12/2002 | Weeren et al. | 455/463 |
| 6,684,370 | B1 | 1/2004 | Sikorsky et al. | 715/205 |

(Continued)

FOREIGN PATENT DOCUMENTS

| EP | 1 347 397 A2 | 9/2003 | G06F 17/30 |
| EP | 1 956 481 A2 | 8/2008 | G06F 9/44 |
| WO | WO 2008/101236 A1 | 8/2008 | |

OTHER PUBLICATIONS

Genest, Aaron et al., Looking Ahead: Comparison of page Preview Techniques for Goal-Directed Web Navigation, International Federation for Information Processing, 2009, pp. 378-391.

(Continued)

*Primary Examiner* — Aftab N. Khan
(74) *Attorney, Agent, or Firm* — Campbell Stephenson LLP (57) ABSTRACT

A method for pre-rendering a system response. In one embodiment, the method includes a mobile device sending a first page request to a secondary system via a wireless communication link. The secondary system sends a first reply to the mobile device in response to the secondary system receiving the first page request, wherein the first reply comprises first page information and second page information. The mobile device stores the second page information in memory. The mobile device also displays a first page comprising a visual representation of the first page information.

17 Claims, 9 Drawing Sheets

(56) References Cited

U.S. PATENT DOCUMENTS

| | | | |
|---|---|---|---|
| 6,748,569 B1 | 6/2004 | Brooke et al. | 715/207 |
| 6,763,343 B1 | 7/2004 | Brooke et al. | 717/115 |
| 6,859,820 B1 | 2/2005 | Hauduc et al. | 709/203 |
| 6,871,346 B1 | 3/2005 | Kumbalimutt et al. | 718/104 |
| 6,925,646 B1 | 8/2005 | Korenshtein et al. | 719/328 |
| 6,964,014 B1 | 11/2005 | Parish | 715/205 |
| 6,987,987 B1 | 1/2006 | Vacanti et al. | 455/556.2 |
| 7,007,275 B1 | 2/2006 | Hanson et al. | 718/101 |
| 7,096,224 B2 | 8/2006 | Murthy et al. | 707/100 |
| 7,120,639 B1 | 10/2006 | de Jong et al. | 707/694 |
| 7,139,370 B1 | 11/2006 | Tse | 379/88.17 |
| 7,574,486 B1 | 8/2009 | Cheng et al. | 709/219 |
| 7,747,782 B2 | 6/2010 | Hunt et al. | 709/246 |
| 7,907,966 B1 | 3/2011 | Mammen | 455/557 |
| 8,131,875 B1 | 3/2012 | Chen et al. | 709/246 |
| 8,191,040 B2 | 5/2012 | Hejlsberg et al. | 717/114 |
| 8,386,955 B1* | 2/2013 | Weber et al. | 715/781 |
| 2002/0046240 A1 | 4/2002 | Graham et al. | 709/203 |
| 2002/0078165 A1* | 6/2002 | Genty et al. | 709/217 |
| 2002/0140731 A1 | 10/2002 | Subramaniam et al. | 345/762 |
| 2003/0187984 A1* | 10/2003 | Banavar et al. | 709/225 |
| 2003/0191685 A1* | 10/2003 | Reese | 705/14 |
| 2004/0110490 A1 | 6/2004 | Steele et al. | 455/412.1 |
| 2004/0181467 A1 | 9/2004 | Raiyani et al. | 705/28 |
| 2004/0204116 A1 | 10/2004 | Ben-Efraim et al. | 455/104.1 |
| 2004/0220946 A1 | 11/2004 | Krishnaprasad et al. | 707/100 |
| 2005/0003810 A1 | 1/2005 | Chu et al. | 455/418 |
| 2005/0015375 A1 | 1/2005 | Harjanto | 707/10 |
| 2005/0015513 A1 | 1/2005 | Tran | 709/246 |
| 2005/0044197 A1 | 2/2005 | Lai | 709/223 |
| 2005/0060277 A1 | 3/2005 | Zlatanov et al. | 707/1 |
| 2005/0091272 A1 | 4/2005 | Smith et al. | 707/104.1 |
| 2005/0097526 A1 | 5/2005 | Hauduc et al. | 717/136 |
| 2005/0102281 A1 | 5/2005 | Takahashi | 707/3 |
| 2005/0188353 A1 | 8/2005 | Hasson et al. | 717/116 |
| 2005/0216501 A1 | 9/2005 | Cengiz et al. | 707/103 R |
| 2005/0273705 A1 | 12/2005 | McCain | 715/513 |
| 2006/0059225 A1* | 3/2006 | Stonehocker et al. | 709/202 |
| 2006/0143193 A1 | 6/2006 | Thakkar et al. | 707/100 |
| 2006/0173873 A1 | 8/2006 | Prompt et al. | 707/100 |
| 2006/0200415 A1 | 9/2006 | Lu | 705/50 |
| 2006/0277271 A1* | 12/2006 | Morse et al. | 709/217 |
| 2006/0288280 A1 | 12/2006 | Makela | 715/530 |
| 2007/0061779 A1 | 3/2007 | Dowedeit et al. | 717/120 |
| 2007/0078784 A1 | 4/2007 | Donovan et al. | 705/71 |
| 2007/0100967 A1 | 5/2007 | Smith et al. | 709/219 |
| 2007/0150610 A1 | 6/2007 | Vassilev et al. | 709/230 |
| 2007/0174330 A1 | 7/2007 | Fox et al. | 707/102 |
| 2007/0208704 A1 | 9/2007 | Ives | 707/3 |
| 2007/0214170 A1 | 9/2007 | Lin | 707/102 |
| 2007/0220158 A1 | 9/2007 | Tolgu et al. | 709/230 |
| 2007/0287413 A1 | 12/2007 | Kleitsch et al. | 455/405 |
| 2007/0300237 A1 | 12/2007 | Neil et al. | 719/319 |
| 2008/0028335 A1 | 1/2008 | Rohrabaugh et al. | 715/800 |
| 2008/0040389 A1 | 2/2008 | Seth et al. | 707/104.1 |
| 2008/0072139 A1 | 3/2008 | Salinas et al. | 715/238 |
| 2008/0098018 A1 | 4/2008 | King et al. | 707/101 |
| 2008/0120393 A1 | 5/2008 | Chen et al. | 709/217 |
| 2008/0172608 A1 | 7/2008 | Patrawala et al. | 715/255 |
| 2008/0183758 A1 | 7/2008 | Kennedy | 707/104.1 |
| 2008/0198156 A1 | 8/2008 | Jou et al. | 345/418 |
| 2008/0222242 A1* | 9/2008 | Weiss et al. | 709/203 |
| 2008/0222269 A1 | 9/2008 | Major et al. | 709/217 |
| 2008/0228758 A1 | 9/2008 | Aaltonen et al. | 707/5 |
| 2008/0281866 A1 | 11/2008 | Claussen et al. | 707/103 Y |
| 2008/0288881 A1 | 11/2008 | Aaltonen et al. | 715/764 |
| 2009/0003603 A1 | 1/2009 | Wessel et al. | 380/255 |
| 2009/0005087 A1 | 1/2009 | Lunati et al. | 455/466 |
| 2009/0005122 A1 | 1/2009 | Goldfarb | 455/564 |
| 2009/0006338 A1 | 1/2009 | Ives et al. | 707/3 |
| 2009/0070667 A1 | 3/2009 | Zlatanov et al. | 715/243 |
| 2009/0083232 A1 | 3/2009 | Ives et al. | 707/3 |
| 2009/0094417 A1* | 4/2009 | Carlson et al. | 711/137 |
| 2009/0100096 A1 | 4/2009 | Erlichson et al. | 707/104.1 |
| 2009/0172101 A1 | 7/2009 | Arthursson | 709/205 |
| 2009/0177685 A1 | 7/2009 | Ellis et al. | 707/103 R |
| 2009/0193141 A1 | 7/2009 | Suresh | 709/235 |
| 2009/0254611 A1 | 10/2009 | Pena et al. | 709/203 |
| 2009/0271762 A1 | 10/2009 | Taylor et al. | 717/107 |
| 2010/0010671 A1 | 1/2010 | Miyamoto | 700/247 |
| 2010/0049984 A1 | 2/2010 | Masushio et al. | 713/179 |
| 2010/0083277 A1 | 4/2010 | Malladi et al. | 719/313 |
| 2010/0174602 A1 | 7/2010 | Zweben et al. | 705/14.41 |
| 2010/0174717 A1 | 7/2010 | Fambon et al. | 707/741 |
| 2010/0191777 A1 | 7/2010 | Ylonen | 707/803 |
| 2010/0228880 A1 | 9/2010 | Hunt et al. | 709/246 |
| 2010/0235473 A1* | 9/2010 | Koren et al. | 709/219 |
| 2010/0262780 A1* | 10/2010 | Mahan et al. | 711/118 |
| 2010/0299438 A1 | 11/2010 | Zimmerman et al. | 709/226 |
| 2010/0299588 A1 | 11/2010 | Dattilo et al. | 715/234 |
| 2010/0332586 A1* | 12/2010 | Jogand-Coulomb et al. | 709/203 |
| 2010/0333153 A1 | 12/2010 | Sahota et al. | 725/97 |
| 2012/0047445 A1* | 2/2012 | Rajagopal | 715/747 |
| 2012/0071146 A1 | 3/2012 | Shrivastava et al. | 455/414.3 |
| 2012/0071155 A1 | 3/2012 | Carter et al. | 455/422.1 |
| 2012/0072477 A1 | 3/2012 | Carter et al. | 709/201 |
| 2012/0079009 A1 | 3/2012 | Carter et al. | 709/203 |
| 2012/0079367 A1 | 3/2012 | Carter et al. | 709/201 |
| 2012/0089695 A1* | 4/2012 | Fainberg et al. | 709/213 |
| 2012/0124163 A1 | 5/2012 | Carter et al. | 709/217 |
| 2012/0151000 A1* | 6/2012 | Snodgrass et al. | 709/217 |
| 2013/0007016 A1* | 1/2013 | Saxena | 707/748 |
| 2013/0275854 A1 | 10/2013 | Lim et al. | 715/234 |
| 2013/0282986 A1* | 10/2013 | Allen et al. | 711/137 |

OTHER PUBLICATIONS

Cioroianu, Andrei, Senior Java Developer and Consultant, Devsphere, "Auto-Save JSF Forms with Ajax, Parts 1, 2, and 3," Aug. 7, 2007, 40 pages.

Jones, Robert, "Creating Web Content for Mobile Phone Browsers, Part 1," Feb. 6, 2004; pp. 1-7, (7 pages).

Cooperman, Gene et al., "Marshalgen: Marshaling Objects in the Presence of Polymorphism", College of Computer and Information Science, 161 CN: Northeastern University, Boston, MA;MA IPPS/SPDP;1999; pp. 616-622 (7 pages).

* cited by examiner

METHOD AND APPARATUS FOR PRE-RENDERING EXPECTED SYSTEM RESPONSE

CROSS-REFERENCE TO RELATED APPLICATIONS

This application claims priority to Provisional Application No. 61/384,150 filed on Sep. 17, 2010, and is incorporated herein in its entirety by reference.

BACKGROUND OF THE INVENTION

Enterprise applications are integral parts of many businesses and provide valuable services to users. For example, enterprise applications provide customer relationship management (CRM), resource planning, human resource management, etc. The present invention will be described with reference to an example CRM that provides sales and marketing services to its users, it being understood that the present invention should not be limited thereto.

CRM is a widely implemented strategy for managing a company's interaction with customers, clients, and sales prospects. CRM involves technology to organize, automate, and synchronize business processes-principally sales activities, but also those for marketing, customer service, and technical support. The overall goals of CRM are to find, attract, and win new clients, nurture and retain those the company already has, etc.

Users can access CRM services through mobile devices (e.g., smart phones or tablet computers) that are coupled to a data processing system the implements the CRM. The present invention will be described with reference to providing CRM services to users via their mobile devices, it being understood that the present invention should not be limited thereto.

SUMMARY

A method for pre-rendering a system response. In one embodiment, the method includes a mobile device sending a first page request to a secondary system via a wireless communication link. The secondary system sends a first reply to the mobile device in response to the secondary system receiving the first page request, wherein the first reply comprises first page information and second page information. The mobile device stores the second page information in memory. The mobile device also displays a first page comprising a visual representation of the first page information. Thereafter, the mobile device sends a second page request to the secondary system in response to user interaction with the displayed first page. The secondary system sends a second reply to the mobile device in response to the secondary system receiving the second page request. However, before the mobile device receives the second reply, the mobile device displays a partial second page using the second page information stored in memory. After the mobile device displays the partial second page, the mobile device displays the second page using information contained in the second reply.

BRIEF DESCRIPTION OF THE DRAWINGS

The present invention may be better understood, and its numerous objects, features, and advantages made apparent to those skilled in the art by referencing the accompanying drawings.

FIGS. 6A and 5B graphically illustrate external components of an example mobile device employed in FIG. 1.

The use of the same reference symbols in different drawings indicates similar or identical items.

DETAILED DESCRIPTION

Today's sales and marketing workforce is more mobile than ever. To reduce sales downtime, increase customer face time, and win more deals, many companies now employ mobile CRM to move their business forward while employees are on the road. Mobile CRM enable users to more efficiently use CRM services such accessing, reviewing, and/or updating sales opportunities, contacts, leads, calendar entries, etc., through user interfaces (UIs) or pages displayed on their mobile devices.

Figure 1:
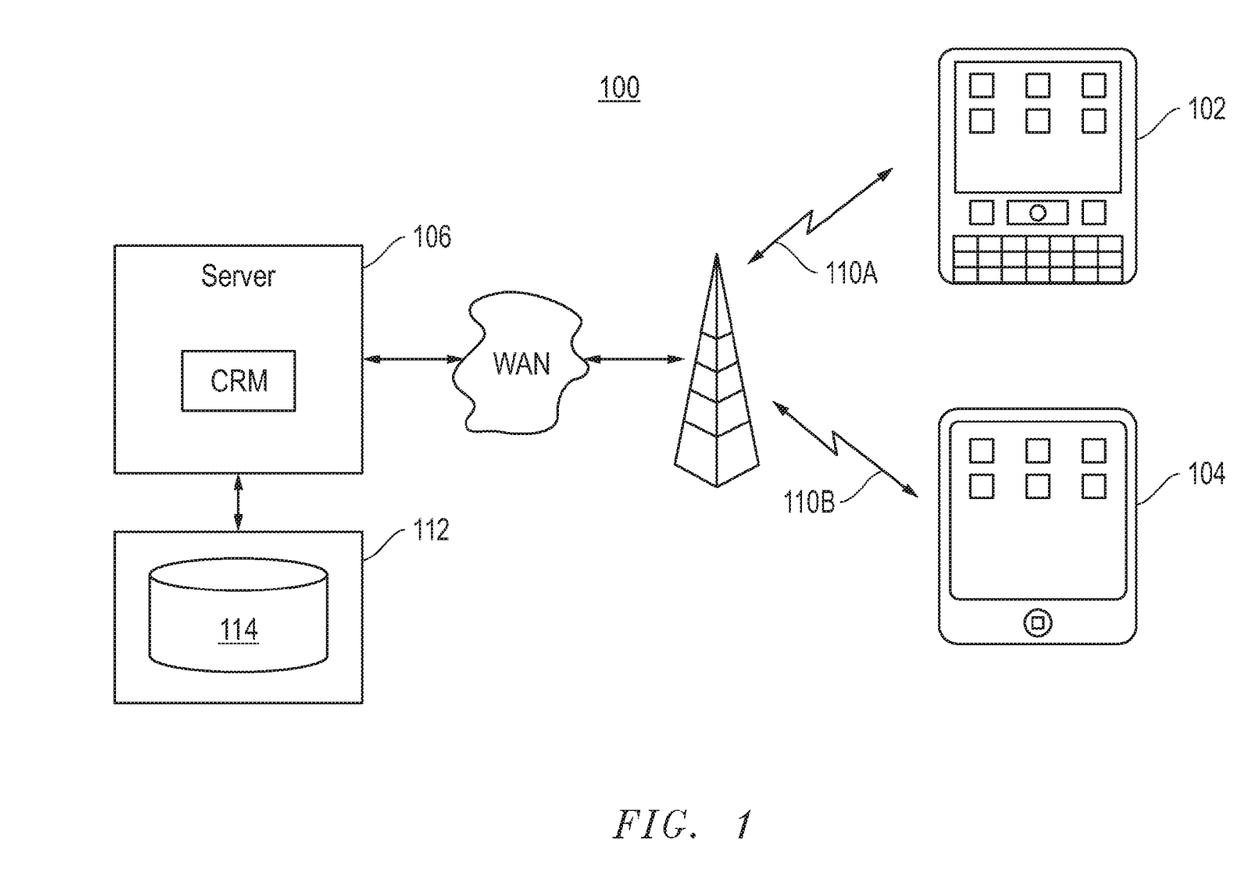
FIG. 1 graphically illustrates relevant components of an example system that employs mobile CRM.

FIG. 1 illustrates in block diagram form, relevant components of a system 100 that provides mobile CRM in accordance with one embodiment of the present invention. System 100 includes mobile devices (e.g., smart phones) 102 and 104 in wireless communication with a CRM executing on server 106. The CRM is in data communication with a storage system 112 that includes one or more relational databases 114 that store data of a logical data model. For purposes of explanation only, storage system 112 is presumed to include a single relational database 114.

Relational database 114 stores data of a logical data model, which in turn consists of business objects. A business object may represent a logical entity that stores a set of instance variables or properties, also known as attributes, and associations with other business objects, thereby weaving a map of objects representing business relationships. A business object may represent a data entity that may contain related data held in many tables of the relational database 114. A business object may be made of business components that map to these tables. A business object is an object type that glues related business components together. A business component is said to provide a layer of wrapping over the tables. Opportunities, accounts, and contacts are examples of business objects.

The CRM of FIG. 1 operates with mobile devices 102 and 104, which are substantially different in design and operation. In other words, the CRM is designed to be mobile device independent. The CRM includes a single, metadata driven application that contains multiple views or page definitions. As will be more fully described, in response to receiving a page request from mobile device 102 or 104, the CRM replies by merging or binding a selected page definition with data of a logical data model, the result of which is serialized and sent to the mobile device 102 or 104. Mobile device 102 or 104 receives the reply, deserializes content contained therein, and subsequently displays a page that includes visual representations of the merged data and other components. Serialization is the process of converting a data structure or object state into a format that can transmitted across a network communication link and "resurrected" later in another device such as mobile device 102 or 104.

Figure 2:
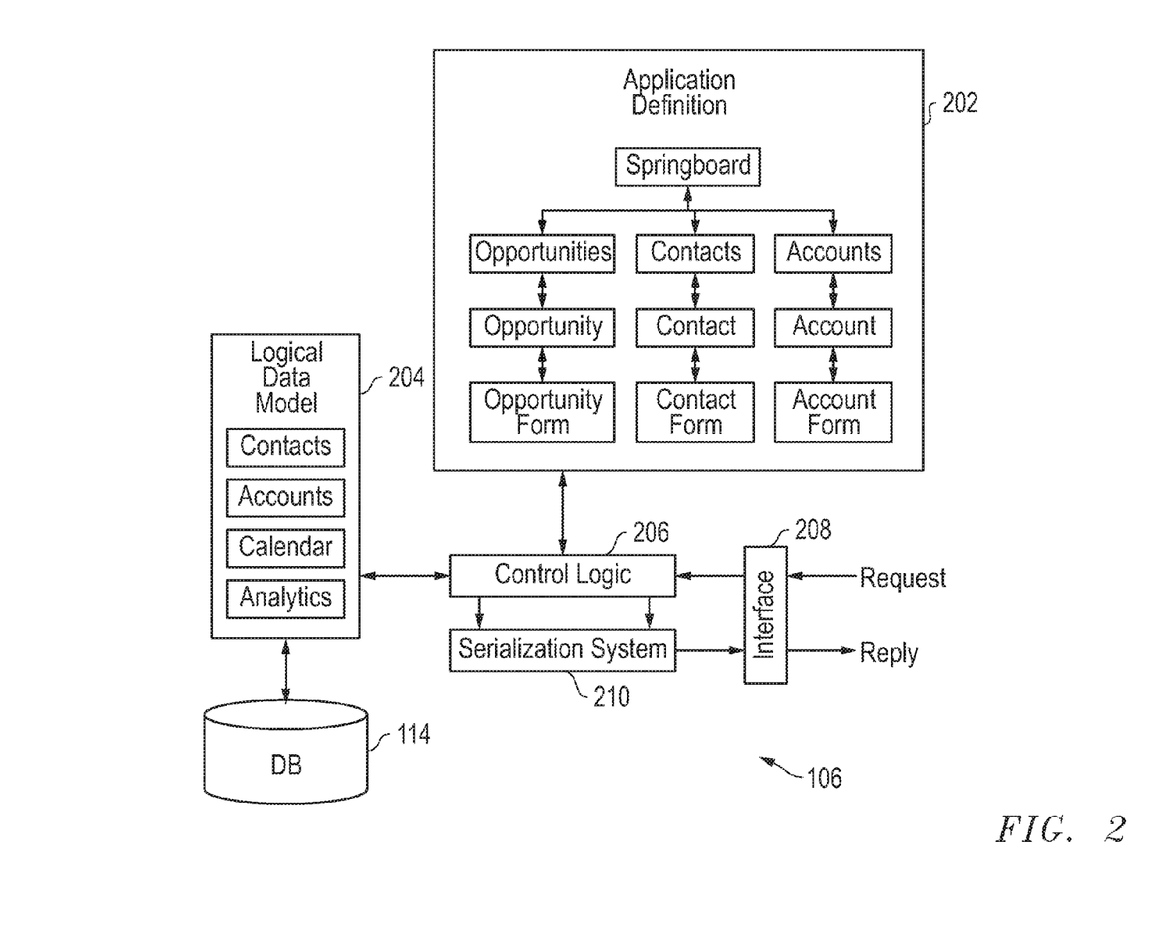
FIG. 2 graphically illustrates relevant components of an example server employed in FIG. 1.

With continuing reference to FIG. 1, FIG. 2 illustrates relevant components of an example server 106 in block diagram form. The CRM implements a model-view-controller architecture. Memory 202 stores an application definition for the CRM. The application definition includes page definitions, some of which are visually represented along with navigation flow relationships therebetween. Page definitions (also known as "views") form the basis of pages that are displayed by mobile devices 102 or 104. The application definition can be built using Java Server Faces (JSF) technology, it being understood the present invention should not be limited thereto. JSF provides standard, reusable components for creating pages that can be displayed on mobile devices. JSF provides useful, special tags to enhance page definitions. Each tag gives rise to an associated component. JSF can also be used to define page navigation within the application definition, map page components to a data model, etc. While page definitions run on server 106, they are displayed on mobile devices 102 or 104. Example page definitions are visually represented in memory 202. The "springboard" page definition can be used to render a page with icons arranged in a two-dimensional pattern. Each icon may represent a mini-application or high level business object within the logical data model. The "accounts," "opportunities," and "contacts" page definitions can be used to render pages with names or other information of accounts, opportunities, and contacts, respectively, in a list pattern. The "account," "opportunity," and "contact" page definitions can be used to render pages with data from an account, opportunity, and contact, respectively, in a form pattern. The "account form," "opportunity form," and "contact form" page definitions can be used to render pages with data from an account, opportunity, and contact, respectively, in a user editable form pattern. Other page definitions in memory 202 are contemplated.

Page definitions can be used to render logical data model 204 into a form suitable for interaction by a user of mobile device 102 or 104. Logical data model 204 manages the data of the application definition, responds to requests for information about its state (usually from a page definition), and responds to instructions to change state from control logic 206. In one sense, logical data model 204 provides access to business objects such as contacts, analytics, opportunities, etc. The logical data model 204 is both the data and the business/domain logic needed to manipulate the data of the application definition.

Control logic 206, which may take form in instructions executing on a processor, is in data communication with the application definition contained within memory 202 in addition to being in data communication with interface 208 and serialization system 210. Control logic 206 can receive a page request from mobile device 102 or 104 via interface 208. Based on data of the request, control logic 206 may access the application definition in memory 202 to identify and retrieve a page definition, or relevant components thereof, which is needed to form the appropriate reply. The retrieved page definition may contain metadata that can be used to retrieve relevant data of the logical data model 204. Control logic 206 can make calls on business objects of logical data model 204 to retrieve the needed data. The page definition can be merged or bound with data from model 204, the result of which is serialized and subsequently transmitted to the requesting mobile device as a reply. Ultimately, the requesting mobile device receives the reply, deserializers its content, and displays a corresponding page.

Figure 3:
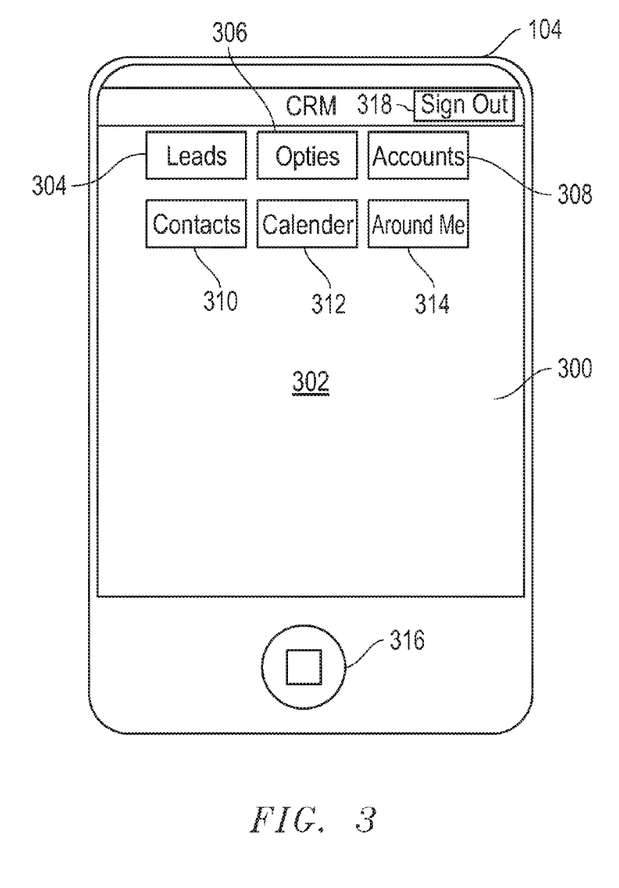
FIG. 3 graphically illustrates external components of an example mobile device employed in FIG. 1.

FIG. 3 illustrates an example page that is displayed by mobile device 104 in response to a user's invocation of a session with the CRM. With continuing reference to FIG. 2, mobile device 104 of FIG. 3 includes a touch sensitive display screen 300 that displays a page 302 with actionable icons 304-314. Mobile device 104 also includes a physical button 316 and a soft button 318 that, when activated, ends the user's session with the CRM. A user can activate a soft button or icon by simply by touching it. Although not shown, a soft keyboard can be displayed on screen 300.

Many pages transmitted to and subsequently displayed by mobile device 104 in real time present data and other visual components in patterns that are familiar to the user. Page 302 represents intent to display objects (icons 304-314) in a two dimensional array pattern. Icons 304-314 correspond to high level business objects or mini applications of the CRM. Icons 304-314 are actionable.

Figure 4A:
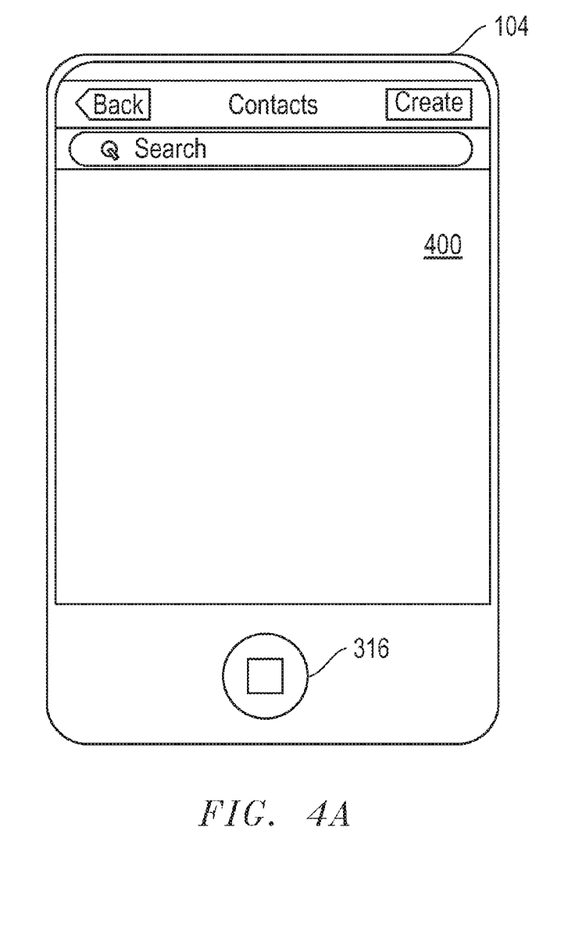
FIGS. 4A and 4B graphically illustrate external components of an example mobile device employed in FIG. 1.

With continuing reference to FIGS. 1-3, in response to user activation of the Contacts icon 310, mobile device 104 generates and sends a request to the CRM for a corresponding Contacts page. In response, CRM sends a reply that contains a serialization of a contacts page definition merged with selected data from data model 204. There can be a delay between the time the page request is sent to the CRM and the time the corresponding reply is received at mobile device 104. To ameliorate user dissatisfaction with the delay, mobile device 104 pre-renders a portion of the expected page using pre-rendering information contained in memory of mobile device 104. To illustrate, FIG. 4A shows an example of a Contacts page 400 that is pre-rendered by mobile device 104 before mobile device 104 receives the reply from the CRM. Pre-rendered page 400 includes features that are expected. The features include the "Contacts" title, the "Back" and "Create" buttons, and a search field that is designated "Search." Additional expected features include page shading, color, shapes, sizes, the pattern in which model data will be presented etc.

Figure 4B:
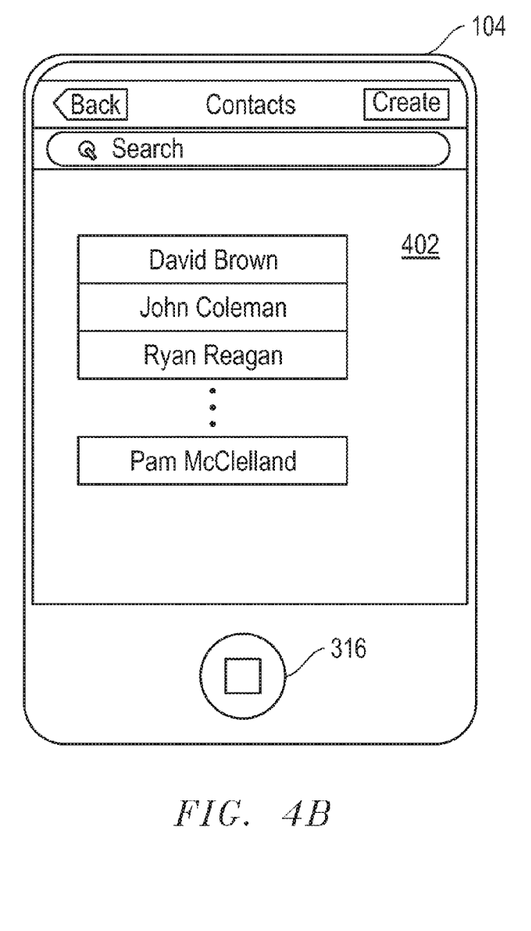

When mobile device 104 receives the requested reply, mobile device 104 can overwrite the pre-rendered page. Continuing with the illustrated example, when mobile device 104 receives the Contacts reply from the CRM, mobile device 104 overwrites pre-rendered page 400 with page 402 shown in FIG. 4B. Page 402 is similar to pre-rendered page 400, but includes data from logical data model 204 (e.g., contacts David Brown, John Coleman, etc.) in a list pattern. Contacts page 402 contains the same "Back" and "Create" buttons of pre-rendered page 400. In contrast to the Back and Create buttons of FIG. 4A, however, the Back and Create buttons of page 402 are active. Page 402 also includes an active Search field into which a user can enter a search term (e.g., a specific contact name). The page shading, color, size of buttons, position of buttons, etc., in page 400 and 402 should be similar if not identical. Further, mobile CRM pages, such as pages 400 and 402, displayed by mobile device 104 should have a look and feel that is native to mobile device 104. Look and feel is a term used to describe aspects of page design, including elements such as colors, shapes, layout, and typefaces (the "look"), as well as the behavior of dynamic elements such as buttons, boxes, and menus (the "feel").

Figure 5A:
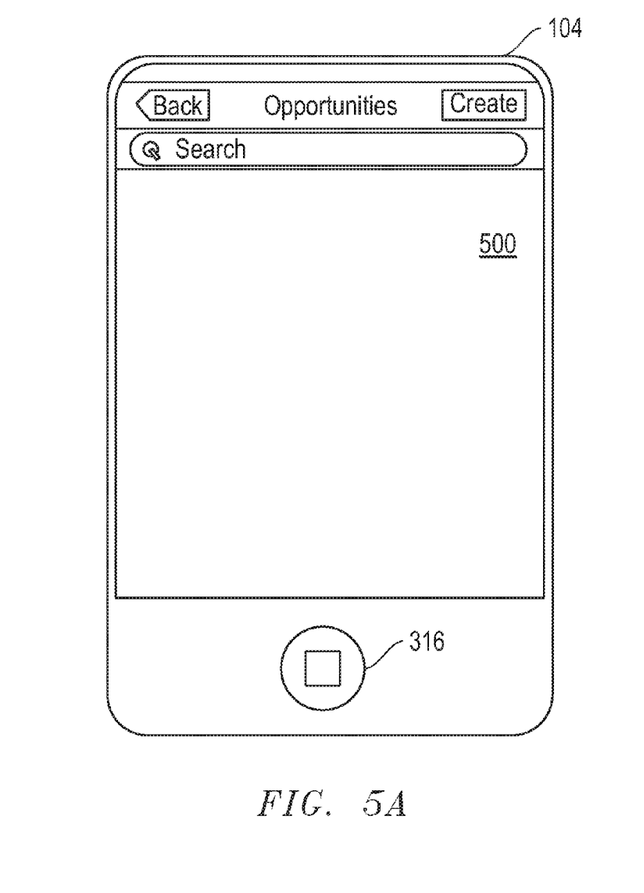
FIGS. 5A and 5B graphically illustrate external components of an example mobile device employed in FIG. 1.

As noted, mobile device 104 includes a memory that contains pre-rendering information that is accessed upon user activation of an active button or link. This memory may contain more than one set of pre-rendering information with each set relating to a different user action. FIG. 4A illustrates a pre-rendered page that is displayed in response to user activation of the Contacts icon 310. Instead of activating the Contacts icon 310, the user could have activated the Opportunities icon 306. With continuing reference to FIGS. 1-3, in response to user activation of the Opportunities icon 306, mobile device 104 generates and sends a request to the CRM for the Opportunities page. In response, CRM sends a reply that contains a serialization of an opportunities page definition merged with selected data from model 204. Before the reply is received, however, mobile device pre-renders a portion of the Opportunities page using pre-rendering information contained in memory of mobile device 104. FIG. 5A illustrates an example of pre-rendered Opportunities page 500. Pre-rendered page 500 includes features that are expected in the Opportunities page requested from the CRM. The expected features include the "Opportunities" title, the "Back" and "Create" buttons, and a search field that is designated "Search." Additional features may include page shading, color, button shapes and sizes, the pattern in which model data will be presented etc.

Figure 5B:
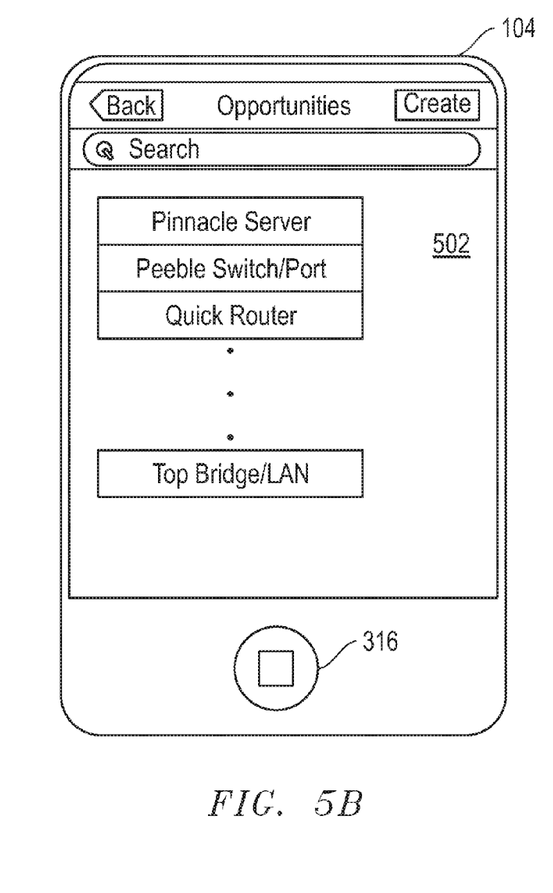

When mobile device receives the Opportunities reply from the CRM, mobile device 104 overwrites page 500 with page 502 shown in FIG. 5B. Page 502 is similar to pre-rendered page 500, but includes opportunities in a list pattern. Opportunities page 502 contains the "Back" and "Create" buttons of pre-rendered page. In contrast to the Back and Create buttons of FIG. 5A, however, the Back and Create buttons of page 502 are active. Page 502 also includes an active Search field into which a user can enter a search term (e.g., a specific opportunities name). The page shading, button sizes, button positions, etc., in page 500 and 502 should be similar. The Opportunities pages 500 and 502 should have a look and feel that is similar to the look and feel of Contacts pages 402.

Figure 6A:
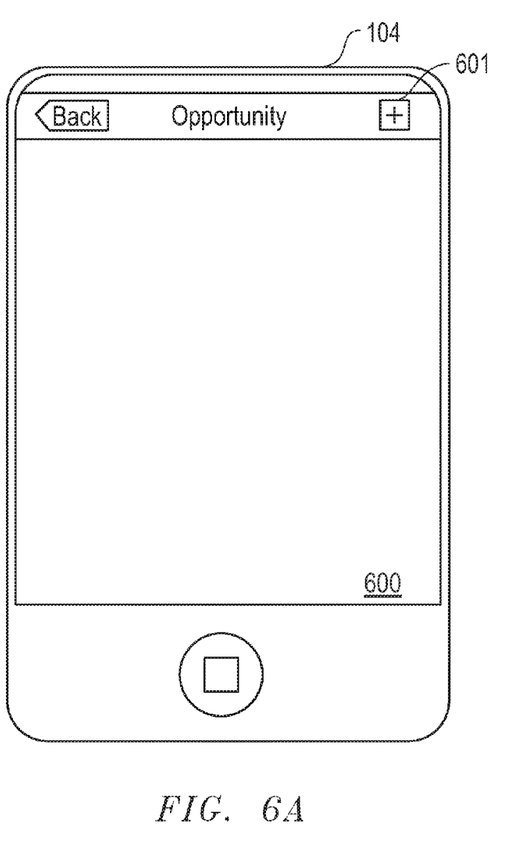

FIGS. 4A and 5A illustrate alternative examples of pages that can be pre-rendered by mobile device 104 using distinct sets of information concurrently stored in memory. Pre-rendering information in this memory may be static. In an alternative embodiment, the pre-rendering information stored in mobile device 104 may be updated with each reply received from the CRM. To illustrate, the Contacts or Opportunities reply from the CRM may contain new pre-rendering information that can be used to pre-render subsequent pages. When mobile device 104 receives the Contacts reply or the Opportunities reply from the CRM, mobile device may replace existing pre-rendering information in the memory with one or more new sets of pre-rendering information contained in Contacts or Opportunities reply. To illustrate this aspect, presume mobile device receives and stores new pre-rendering information that is included in the Opportunities reply. The new pre-rendering information can be used to pre-render a subsequent page. To illustrate, when the user activates the active "Pinnacle Server" opportunity element of page 502, mobile device 104 generates and sends a request to the CRM for the Pinnacles Server opportunity page. In response, CRM sends a reply that contains a serialization of an opportunity page definition merged with the appropriate Pinnacles Server data from data model 204. Before the reply is received from the CRM, however, mobile device pre-renders a portion of the Pinnacles Server opportunity page using pre-rendering information contained in the prior reply. FIG. 6A illustrates an example of an "Opportunity" page 600 that is pre-rendered by mobile device 104 in response to user activation of the "Pinnacle Server" active element of page 502. Pre-rendered page 600, like other most other pages pre-rendered in accordance with one embodiment of the present invention, includes features that are expected in the Pinnacle Server page requested from the CRM. These features include the page title "Opportunity," field titles (e.g., Opportunity Name, Sales Account, etc.), the "Back" button, and an edit button 601. Additional features may include page shading, color, button shapes, button sizes, the pattern in which model data will be presented, etc.

Figure 6B:
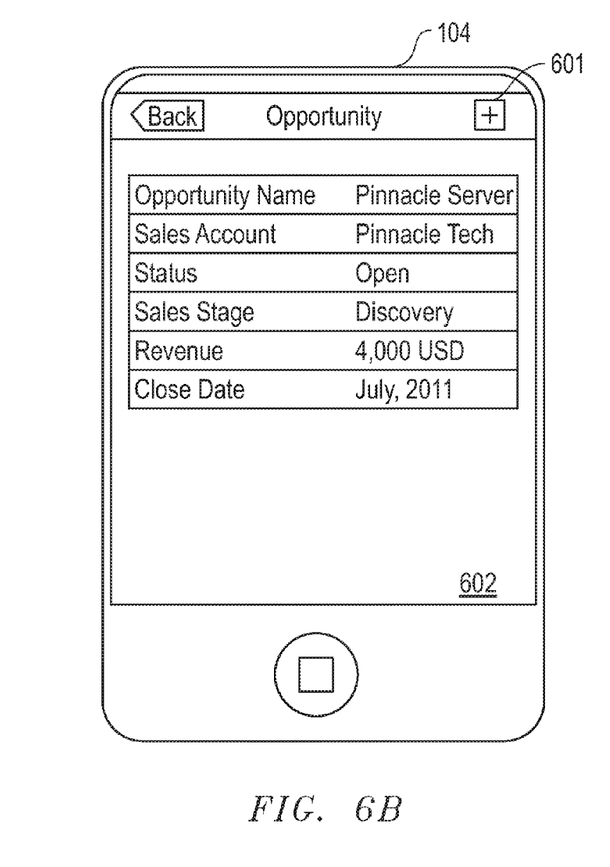

When mobile device 104 receives the actual Pinnacle Server reply from the CRM, mobile device 104 overwrites page 600 with page 602 shown in FIG. 6B. Page 602 is similar to pre-rendered page 600, but includes Pinnacle Server opportunity information in a form pattern. In general, a form pattern can be used to expose details of a business object such as the Pinnacle Server opportunity. Pinnacle Server opportunity page 602 contains an active "Back" button and an active edit button 601. The Pinnacle Server opportunity pages 600 and 602 have a look and feel that is similar to the look and feel of Opportunities pages 502.

Mobile devices that rely on secondary systems (e.g., the CRM executing on server 106) to produce pages for display experience a delay between the time a new page is requested and the time the new page is displayed. The time delay is referred to as the response time. There are many factors that add to total response time such as the time it takes for the mobile device to generate and send a page request, the time needed for serialization system 210 to serialize a reply before it is transmitted to mobile device 104, the time it takes a wireless communication link to transmit the reply, the time it takes for mobile device 104 to deserialize content of the reply, etc. Short response times are favored by users of mobile devices including mobile device 104.

As noted above, mobile device 104 is capable of pre-rendering portions of a requested page before the contents of the requested page is received from the CRM. The pre-rendering can provide an illusion the response time is shorter than it actually is. In other words, the perceived response time of mobile devices such as mobile device 104 may be reduced by pre-rendering the expected page.

As noted above, the CRM replies to page requests from mobile devices. The replies may include one or more sets of pre-rendering information (e.g., transition, page type, page title, etc.). Each set of pre-rendering information can be used by mobile device 104 to pre-render a subsequent page such as pages 500 and 600 described above. The pre-rendering information included in a reply may vary based on several factors, some of which include: the type of page request that lead to the reply sent by the CRM; the context of the user's session with the CRM when the request is sent to the server, etc. Ultimately, when the mobile device transmits a subsequent request to the CRM, the mobile device may pre-render the new page that is expected using some or all of the pre-rendering information that was provided in the immediately preceding reply from the CRM. The pre-rendering information when rendered by the mobile device should result in the display of a page having the right shading, color, shapes, sizes, title, pattern, etc. However, the pre-rendered page will lack visual representations of data from the logical data model 204. Importantly, the pre-rending of the new page is typically performed before the CRM replies with the requested new page. When the requested new page is received by mobile device 104, mobile device paints over the pre-rendered page with the page provided in the reply. Further, the reply containing the new page will also include pre-rendering information that can be employed in subsequent pages for display on mobile device 104.

Figure 7:
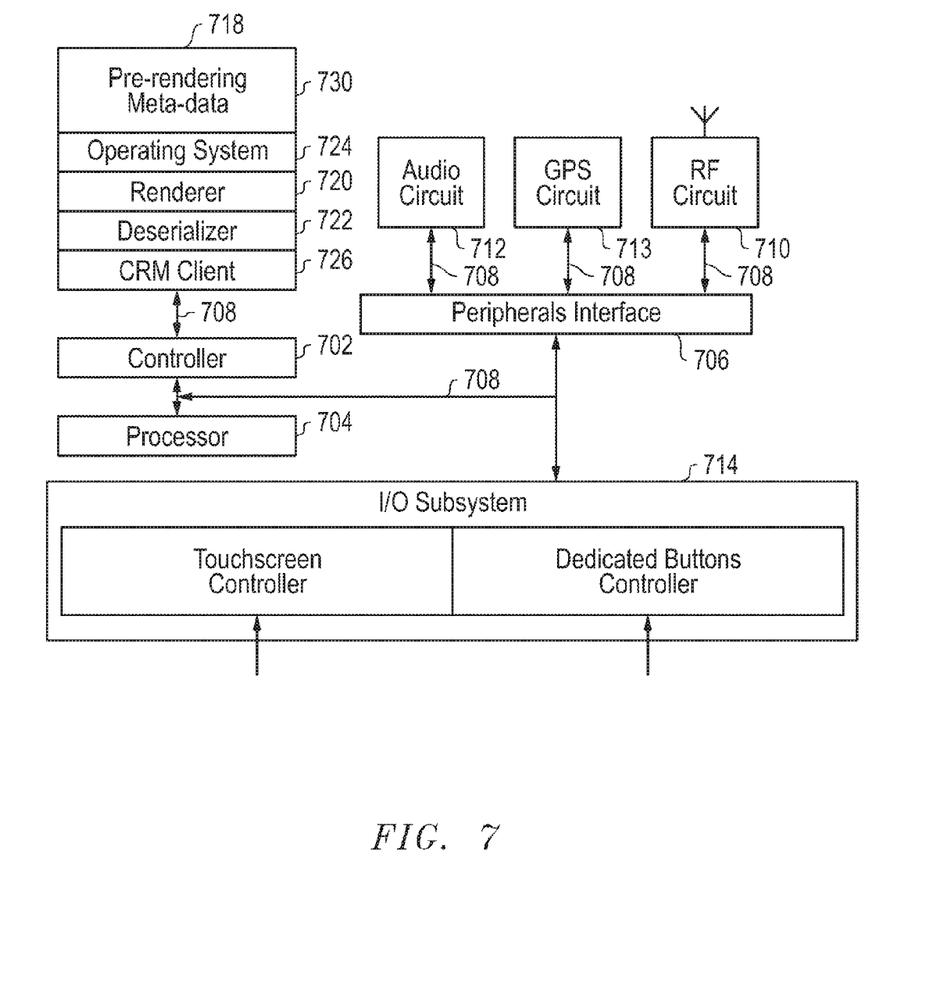
FIG. 7 graphically illustrates internal components of an example mobile device employed in FIG. 1.

FIG. 7 shows in block diagram form relevant internal components of mobile device 104. As will be more fully described, mobile device 104 includes a memory that stores pre-rendering information received in a reply from the CRM. With continuing reference to FIGS. 2 and 3, mobile device 104 of FIG. 7 includes a memory controller 702 coupled to a processor 704 and a peripherals interface 706. The various components of mobile device 104 may be coupled by one or more communication buses or signal lines 708. The peripherals interface 706 is coupled to RF circuit 710, audio circuit 712, and global positioning system (GPS) circuit 713, which supports location determining capabilities.

The peripherals interface 702 is coupled to an I/O subsystem 714 that contains various controllers that interact with other components of mobile device 104. I/O subsystem 714 includes a touch screen controller that is coupled to the touch sensitive display screen shown in FIG. 3. The touch screen controller may detect contact and any movement or break thereof.

Memory controller 702 is coupled to memory 718, which may take form in one or more types of computer readable medium. Memory 718 includes storage 730 for pre-rendering information. Memory 718 also stores several software components or modules including a communication module that provides communication procedures, which enable communication between mobile device 104 and server 106 via wireless communication link 110B shown in FIG. 1. Memory 718 may also include a plist deserializer 722, an operating system 724, and a set of applications including CRM client 726 as shown. Other components in memory 718 may support email service, texting, etc. The CRM client 726, as will be more fully described below, operates in conjunction with modules shown within FIG. 7 to pre-render a page using information stored in memory structure 730. CRM client 726 is also configured to create a request for a subsequent page, issue instructions to initiate functions such as email, cell phone, mapping, etc.

Figure 8:
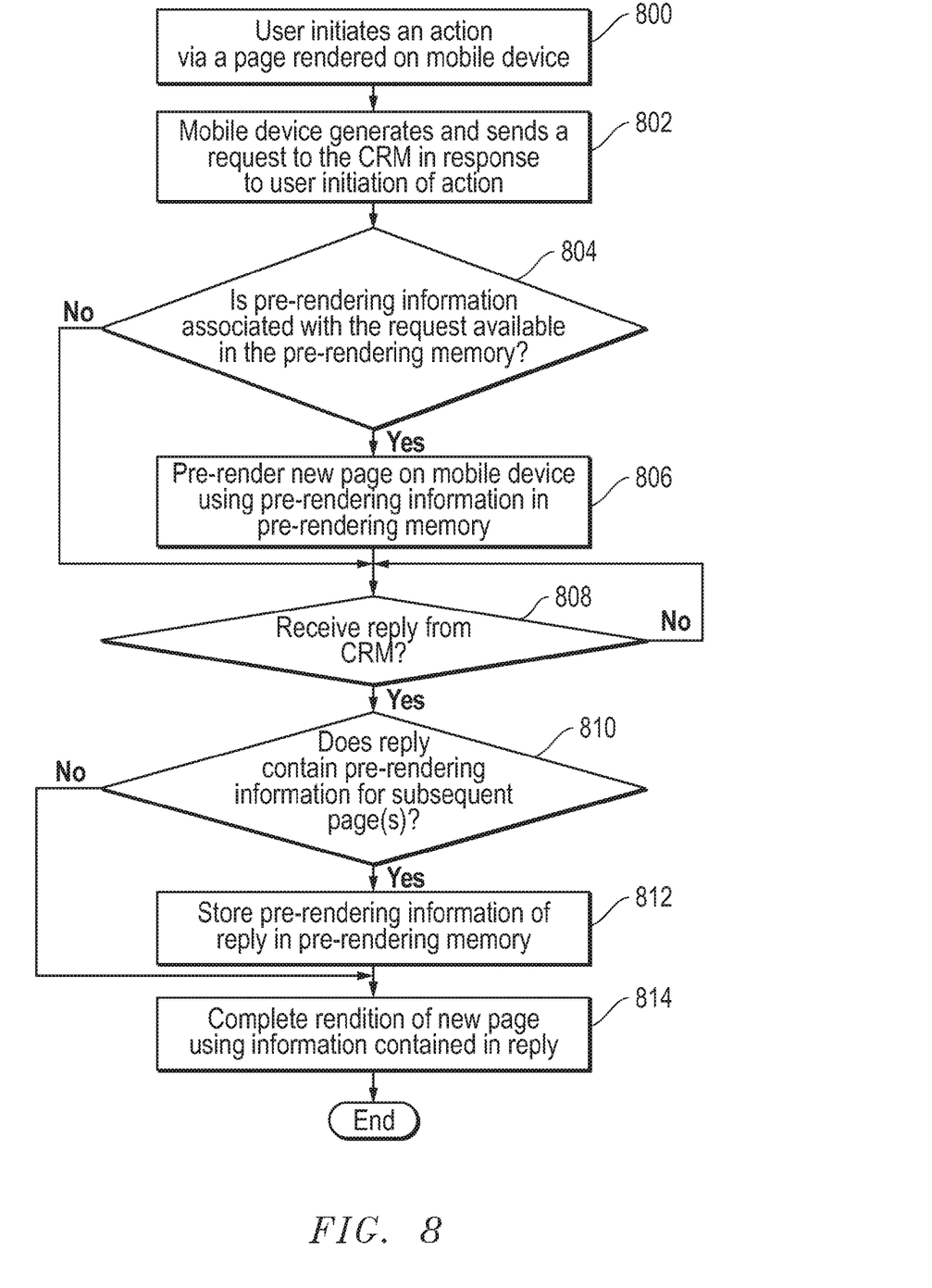
FIG. 8 illustrates relevant aspects a process implemented by the example mobile device shown in FIGS. 1-7.

FIG. 8 illustrates relevant aspects of a process implemented by mobile device 104 when pre-rendering a page. With continued reference to FIG. 7, the process is implemented by the mobile device 104 in response to a user activation of an element of a displayed page. More particularly, the process shown in FIG. 8 begins with step 800 when the user activates an element on a page displayed on a mobile device. FIG. 5B illustrates the opportunities page 502 displayed on mobile device 104. A user of mobile device 104 can activate element "Pinnacle Server." In step 802, CRM client 726, while executing on processor 704 and in cooperation with other functional modules in mobile device 104, generates and sends a request to the CRM. Thereafter, the CRM client 726 accesses pre-rendering information in memory structure 730 to determine whether it contains pre-rendering information that is associated with the request generated in step 802. If memory 730 includes associated pre-rendering information, the pre-render information is read and subsequently rendered for display on mobile device 104. The pre-rendering information stored within memory 730 may include a title for the page to be pre-rendered, pattern information that identifies the display layout (e.g., list pattern, form pattern, etc.) for the page to be pre-rendered, model data transition information such as pop, push, close, or open, etc. Other pre-rendering information is contemplated. In one embodiment, the push or pop information identifies how the page currently displayed on mobile device 104 is to be replaced with the pre-rendered page. In one embodiment, a push transition may involve mobile device 104 sliding the currently displayed page on mobile device 104 to the right as the pre-rendered page slides in from the left.

If memory 730 includes pre-rendering information associated with the request generated in step 802, then a pre-render screen is displayed on mobile device 102. If, however, memory 730 lacks pre-rendering information associated with the request, the process proceeds to step 808 where mobile device 104 waits for the reply from the CRM. Eventually, mobile device 104 will receive the reply, and in step 810, the CRM client 726 inspects the reply to see whether it contains pre-rendering information for a subsequent page or pages. If it does, this information is written to pre-rendering memory 730, thereby replacing, overriding or augmenting the existing pre-rendering information contained therein as shown in step 812. Otherwise, the mobile device 102 will render the page defined in the reply for display as shown in step 814.

Figure 9:
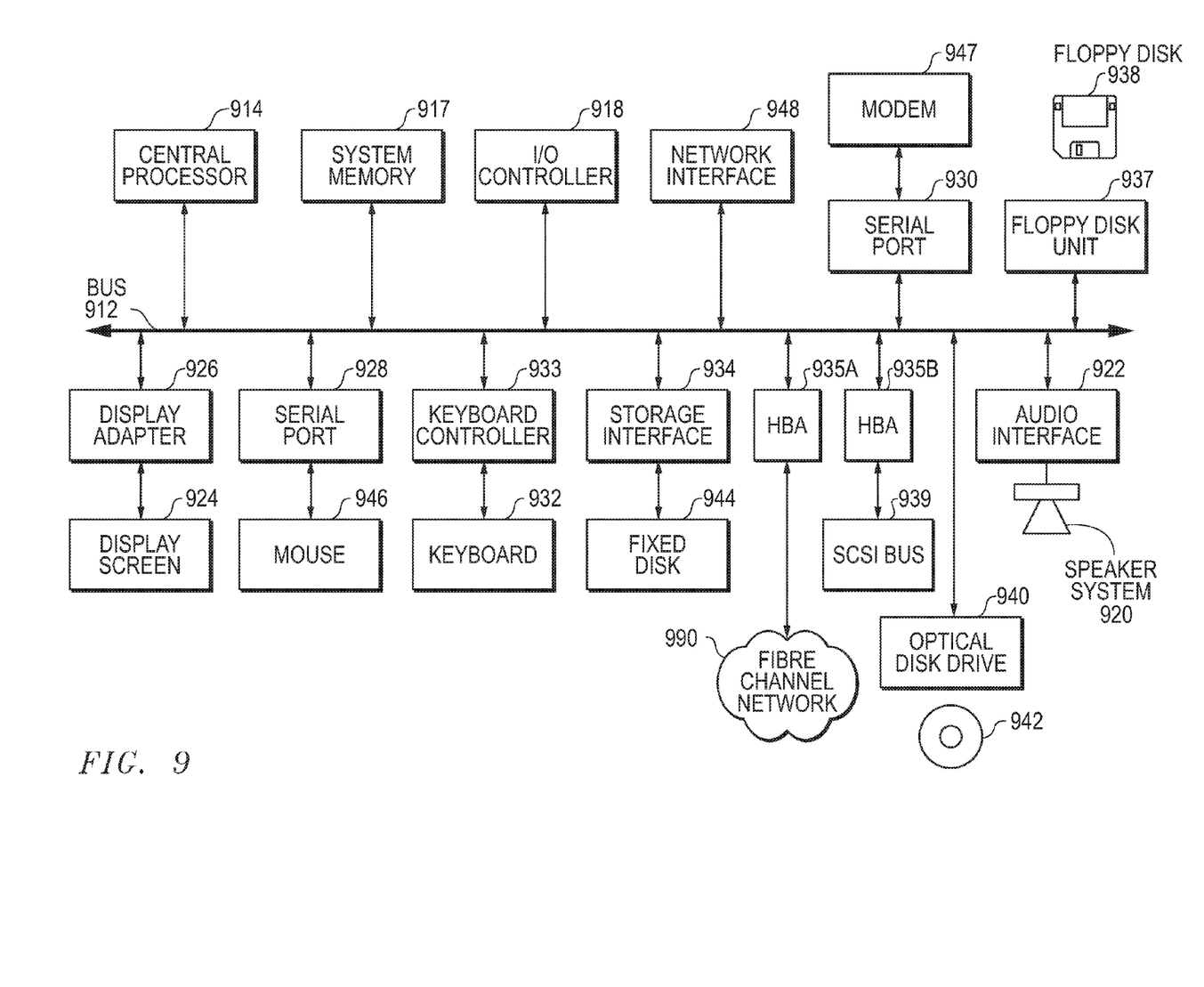
FIG. 9 is a block diagram of an example computer system that may be employed in the system of FIG. 1 or 2.

FIG. 9 depicts a block diagram of a computer system 910 suitable for implementing the present disclosure. Computer system 910 may be illustrative of various computer systems (e.g., servers or clients) shown in FIGS. 1 and 2. Computer system 910 includes a bus 912 which interconnects major subsystems of computer system 910, such as a central processor 914, a system memory 917 (typically RAM, but which may also include ROM, flash RAM, or the like), an input/output controller 918, an external audio device, such as a speaker system 920 via an audio output interface 922, an external device, such as a display screen 924 via display adapter 926, serial ports 928 and 930, a keyboard 932 (interfaced with a keyboard controller 933), a storage interface 934, a floppy disk drive 937 operative to receive a floppy disk 938, a host bus adapter (HBA) interface card 935A operative to connect with a Fibre Channel network 990, a host bus adapter (HBA) interface card 935B operative to connect to a SCSI bus 939, and an optical disk drive 940 operative to receive an optical disk 942. Also included are a mouse 946 (or other point-and-click device, coupled to bus 912 via serial port 928), a modem 947 (coupled to bus 912 via serial port 930), and a network interface 948 (coupled directly to bus 912).

Bus 912 allows data communication between central processor 914 and system memory 917, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 910 are generally stored on and accessed via a computer readable medium, such as a hard disk drive (e.g., fixed disk 944), an optical drive (e.g., optical drive 940), a floppy disk unit 937, or other storage medium. Additionally, applications can be in the form of electronic signals modulated in accordance with the application and data communication technology when accessed via network modem 947 or interface 948.

Storage interface 934, as with the other storage interfaces of computer system 910, can connect to a standard computer readable medium for storage and/or retrieval of information, such as a fixed disk drive 944. Fixed disk drive 944 may be a part of computer system 910 or may be separate and accessed through other interface systems. Modem 947 may provide a direct connection to a remote server via a telephone link or to the Internet via an internet service provider (ISP). Network interface 948 may provide a direct connection to a remote server via a direct network link to the Internet via a POP (point of presence). Network interface 948 may provide such connection using wireless techniques, including digital cellular telephone connection, Cellular Digital Packet Data (CDPD) connection, digital satellite data connection or the like.

The operation of a computer system such as that shown in FIG. 9 is readily known in the art and is not discussed in detail in this application. Code for implementing a CRM can be stored in computer-readable storage media such as one or more of system memory 917, fixed disk 944, optical disk 942, or floppy disk 938. Memory 920 is also used for storing temporary variables or other intermediate information during the execution of instructions by the processor 910. The operating system provided on computer system 910 may be MS-DOS®, MS-WINDOWS®, OS/2®, UNIX®, Linux®, or another known operating system.

Although the invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
    a mobile device sending a first page request to a secondary system via a wireless communication link;
    the secondary system sending a first reply to the mobile device in response to the secondary system receiving the first page request, wherein the first reply comprises first page information and second page information;
    the mobile device storing the second page information in memory;
    the mobile device displaying a first page comprising a visual representation of the first page information, wherein the second page information in memory is linked to a first active element displayed by the first page, wherein the mobile device does not display a visual representation of the second page information at any time while the first page is displayed;
    the mobile device sending a second page request to the secondary system in response to user activation of the first active element displayed by the first page;
    the secondary system sending a second reply to the mobile device in response to the secondary system receiving the second page request;
    before the mobile device receives the second reply and in response to the user activation of the first active element, the mobile device replacing the displayed first page by displaying a partial second page using the second page information stored in memory, wherein the partial second page comprises a visual representation of the second page information;
    after the mobile device displays the partial second page, the mobile device updating the displayed partial second page using data contained in the second reply, wherein updating the displayed partial second page results in the mobile device displaying a second page.

2. The method of claim 1 wherein the displayed partial second page comprises at least one visual feature identical to or similar to a visual feature in the displayed second page.

3. The method of claim 1 wherein the second page information in memory is also linked to a second active element displayed by the first page.

4. The method of claim 1 further comprising:
    the secondary system accessing a database to retrieve the data in response to the secondary system receiving the second page request from the mobile device;
    the secondary system generating the second reply, wherein the second reply comprises the data retrieved from the database;
    wherein the displayed second page comprises a visual representation of the data retrieved from the database.

5. The method of claim 1 wherein the second reply comprises the second page information, the data, third page information, and fourth page information.

6. The method of claim 5 further comprising the mobile device overwriting the second page information in memory with the third and fourth page information.

7. The method of claim 6 further comprising:
    the mobile device sending a third page request or a fourth page request to the secondary system in response to user activation of third or fourth active element, respectively, displayed by the second page;
    the secondary system sending a third reply to the mobile device when the mobile device sends the third page request;
    the secondary system sending a fourth reply to the mobile device when the mobile device sends the fourth page request;
    if the user activates the third active element, the mobile device displaying a partial third page using the third page information stored in the memory before the mobile device receives the third reply;
    if the user activates the fourth active element, the mobile device displaying a partial fourth page using the fourth page information stored in the memory before the mobile device receives the fourth reply.

8. The method of claim 7:
    wherein the mobile device sends the third page request if a user activates the third active element displayed on the second page;
    wherein the mobile device sends the fourth page request if a user activates the fourth active element displayed on the second page.

9. A method implemented by a mobile device, the method comprising:
    sending a first page request to a secondary system;
    receiving a first reply from the secondary system in response to sending the first page request, wherein the first reply comprises first page information, first data retrieved from a database, and second page information;
    storing the second page information in memory;
    displaying a first page comprising a visual representation of the first page information and the first data, wherein the second page information in memory is linked to a first active element displayed by the first page, wherein the mobile device does not display a visual representation of the second page information at any time while the first page is displayed;
    sending a second page request to the secondary system in response to user activation of the first active element displayed by the first page;
    receiving a second reply from the secondary system in response to sending the second page request, wherein the second reply comprises second data retrieved from the database;
    before receiving the second reply and in response to the user activation of the first active element, replacing the displayed first page by displaying a partial second page using the second page information stored in memory, wherein the partial second page comprises a visual representation of the second page information;
    updating the displayed partial second page using the second data contained in the second reply, wherein updating the displayed partial second page results in the mobile device displaying a second page.

10. The method of claim 9 wherein the displayed second page comprises at least one visual feature identical to or similar to a visual feature in the displayed partial second page.

11. The method of claim 9 wherein the second page information is also linked to a second active element displayed by the first page.

12. The method of claim 9 wherein the second reply comprises third and fourth page information, and wherein the method further comprises concurrently storing the third and fourth page information in the memory.

13. A memory comprising instructions executable by a processor of a mobile device, wherein the processor of the mobile device implements a method in response to executing the instructions, the method comprising:
sending a first page request to a secondary system;
receiving a first reply from the secondary system in response to sending the first page request, wherein the first reply comprises first page information and second page information;
storing the second page information in memory;
displaying a first page comprising a visual representation of the first page information, wherein the second page information in memory is linked to a first active element displayed by the first page, wherein the mobile device does not display a visual representation of the second page information at any time while the first page is displayed;
sending a second page request to the secondary system in response to user activation of the first active element displayed by the first page;
receiving a second reply from the secondary system in response to sending the second page request;
before receiving the second reply and in response to the user activation of the first active element, replacing the displayed first page by displaying a partial second page using the second page information stored in memory, wherein the partial second page comprises a visual representation of the second page information;
updating the displayed partial second page using data contained in the second reply, wherein updating the displayed partial second page results in the mobile device displaying a second page.

14. The memory of claim 13 wherein the displayed second page comprises at least one visual feature identical to or similar to a visual feature in the displayed partial second page.

15. The memory of claim 13 wherein the second page information is also linked to a second active element displayed by the first page.

16. The memory of claim 13:
wherein the data in the second reply was retrieved from a database accessible by the secondary system;
wherein the displayed second page comprises a visual representation of the data retrieved from the database.

17. The memory of claim 13 further comprising:
sending a third page request or a fourth page request to the secondary system in response to user interaction with the activation of a third or fourth active element, respectively, displayed by the second page;
receiving a third reply when the mobile device sends the third page request;
receiving a fourth reply when the mobile device sends the fourth page request;
displaying either a partial third page using third page information stored in the memory or a partial fourth page using fourth page information stored in the memory.

* * * * *

UNITED STATES PATENT AND TRADEMARK OFFICE
CERTIFICATE OF CORRECTION

PATENT NO. : 9,122,767 B2
APPLICATION NO. : 13/235990
DATED : September 1, 2015
INVENTOR(S) : Carter et al.

Page 1 of 1

It is certified that error appears in the above-identified patent and that said Letters Patent is hereby corrected as shown below:

In drawings,

On sheet 5 of 9, in FIG. 5B, under Reference Numeral 502, line 2, delete "Peeble" and insert -- Pebble --, therefor.

In specification,

In column 7, line 22, delete "plist" and insert -- list --, therefor.

Signed and Sealed this
Twenty-first Day of June, 2016

Michelle K. Lee
*Director of the United States Patent and Trademark Office*